US006834869B1

(12) United States Patent
Adams

(10) Patent No.: US 6,834,869 B1
(45) Date of Patent: Dec. 28, 2004

(54) SHOPPING CART BRAKING DEVICE

(76) Inventor: Mary Eileen Adams, 104 Seven Stars Rd., Spring City, PA (US) 19475

(*) Notice: Subject to any disclaimer, the term of this patent is extended or adjusted under 35 U.S.C. 154(b) by 0 days.

(21) Appl. No.: 10/661,293

(22) Filed: Sep. 12, 2003

(51) Int. Cl.$^7$ ............................................. B62D 39/00
(52) U.S. Cl. ..................................... 280/33.994; 188/5
(58) Field of Search ....................... 280/33.991–33.998; 188/5, 19

(56) References Cited

U.S. PATENT DOCUMENTS

| | | | | |
|---|---|---|---|---|
| 3,217,839 A | * | 11/1965 | Watkins et al. | 188/4 R |
| 3,394,945 A | * | 7/1968 | Anshel et al. | 280/33.994 |
| 3,652,103 A | * | 3/1972 | Higgs | 280/33.994 |
| 4,524,985 A | * | 6/1985 | Drake | 280/33.994 |
| 4,610,454 A | * | 9/1986 | Gill | 280/33.992 |
| 4,844,209 A | * | 7/1989 | Sedlack | 188/5 |
| 6,126,176 A | * | 10/2000 | Eguchi et al. | 280/5.2 |

* cited by examiner

Primary Examiner—Bryan Fischmann
(74) Attorney, Agent, or Firm—Goldstein Law Offices, P.C.

(57) ABSTRACT

A shopping cart braking device, for use in conjunction with an existing shopping cart, for selectively immobilizing the shopping cart upon a support surface. The braking device comprises a substantially U-shaped tube having a first end, a second end, and a horizontal centrally located connecting portion extending concentrically through a brake pad. The first and second ends of the braking device are hingeably attached to the front crossbar of the shopping cart, in proximity to the front wheels of the shopping cart. When the braking device is in the unbraked position, the braking device has been raised by a foot of the user, and the movement of the shopping cart is unimpeded. When the braking device is in the braked position, the braking device has been lowered by the foot of the user, the brake pad is wedged under the front wheels of the shopping cart, and the shopping cart is immobilized.

6 Claims, 2 Drawing Sheets

SHOPPING CART BRAKING DEVICE

BACKGROUND OF THE INVENTION

1. Field of the Invention

The invention generally relates to a braking device, and in particular relates to a braking device for selectively immobilizing a shopping cart upon a support surface.

2. Description of the Related Art

A shopping cart comprises a basket mounted on wheels which is maneuvered by a handle, and is supplied by stores to shoppers for collecting their purchases in. While the shopping cart is extremely useful for holding and transporting various items, shopping carts are not without their disadvantages. In particular, a shopping cart may inadvertently roll, either while in the store or while unloading the contents of the cart into an awaiting motor vehicle. Such unexpected motion of the shopping cart can cause accidents. Accordingly, there is a need for a shopping cart braking device which may be appended to an existing shopping cart and which is capable of selectively immobilizing the shopping cart while the user is shopping within a store or unloading the contents of the shopping cart.

A variety of shopping cart braking devices are available. For example, U.S. Pat. No. 3,2217,839 to Watkins appears to show a shopping cart braking device with a brake stand, comprised of a crossbar which provides foot contact and acts as a support for the brakes. Additionally, U.S. Pat. No. 5,630,600 to Pasillas appears to show a braking device mounted on the front bar of a conventional shopping cart, and having a brake foot which swings into engagement with a support surface upon manually jerking the cart. Accordingly, Pasillas fails to provide a braking device which directly immobilizes the wheels of the shopping cart. Furthermore, U.S. Pat. No. 5,390,942 to Schuster appears to show a braking device comprising a brake shoe having elongated lever arms pivotally mounted on the frame of the shopping cart and a pedal pivotally mounted on the frame. Accordingly, Schuster fails to provide a braking device with a minimal number of moving parts. Moreover, U.S. Pat. No. 6,123,343 to Nolting, Jr. appears to show a braking device having a braking assembly in communication with a handle assembly which is fitted over the shopping cart handle. Accordingly, Nolting, Jr. fails to provide a braking device which may be selectively activated by the foot of the user.

While these devices may be suitable for the particular purpose employed, or for general use, they would not be as suitable for the purposes of the present invention as disclosed hereafter.

SUMMARY OF THE INVENTION

It is an object of the invention to produce a shopping cart braking device which permits a user to selectively immobilize a shopping cart upon a support surface. Accordingly, the shopping cart braking device has a substantially U-shaped tube having a centrally located brake pad. In use, a user selectively lowers the U-shaped tube, and wedges the brake pad between the wheels of the shopping cart and the support surface, and thereby selectively immobilizes the shopping cart.

It is another object of the invention to produce a shopping cart braking device which may be activated and deactivated with a foot of the user. Accordingly, the braking device is hingeably attached to the chassis of the shopping cart, and is selectively activated or deactivated by raising or lowering the braking device upon its hinges with the foot of the user.

It is yet another object of the invention to produce a shopping cart braking device which may be used with an existing shopping cart. Accordingly, the braking device is easily attachable to the chassis of an existing shopping cart by a variety of methods.

It is an additional object of the invention to produce a shopping cart braking device which enhances the safety of a shopping cart. Accordingly, the braking device prevents the shopping cart from inadvertently rolling while loading or unloading the cart, and thereby enhances the safety of the shopping cart.

It is a further object of the invention to produce a shopping cart braking device which is not unduly expensive. Accordingly, the braking device is simply constructed from readily available materials and its cost is not prohibitive.

The invention is a shopping cart braking device, for use in conjunction with an existing shopping cart, for selectively immobilizing the shopping cart upon a support surface. The braking device comprises a substantially U-shaped tube having a first end, a second end, and a horizontal centrally located connecting portion extending concentrically through a brake pad. The first and second ends of the braking device are hingeably attached to the front crossbar of the shopping cart, in proximity to the front wheels of the shopping cart. When the braking device is in the unbraked position, the braking device has been raised by a foot of the user, and the movement of the shopping cart is unimpeded. When the braking device is in the braked position, the braking device has been lowered by the foot of the user, the brake pad is wedged under the front wheels of the shopping cart, and the shopping cart is immobilized.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
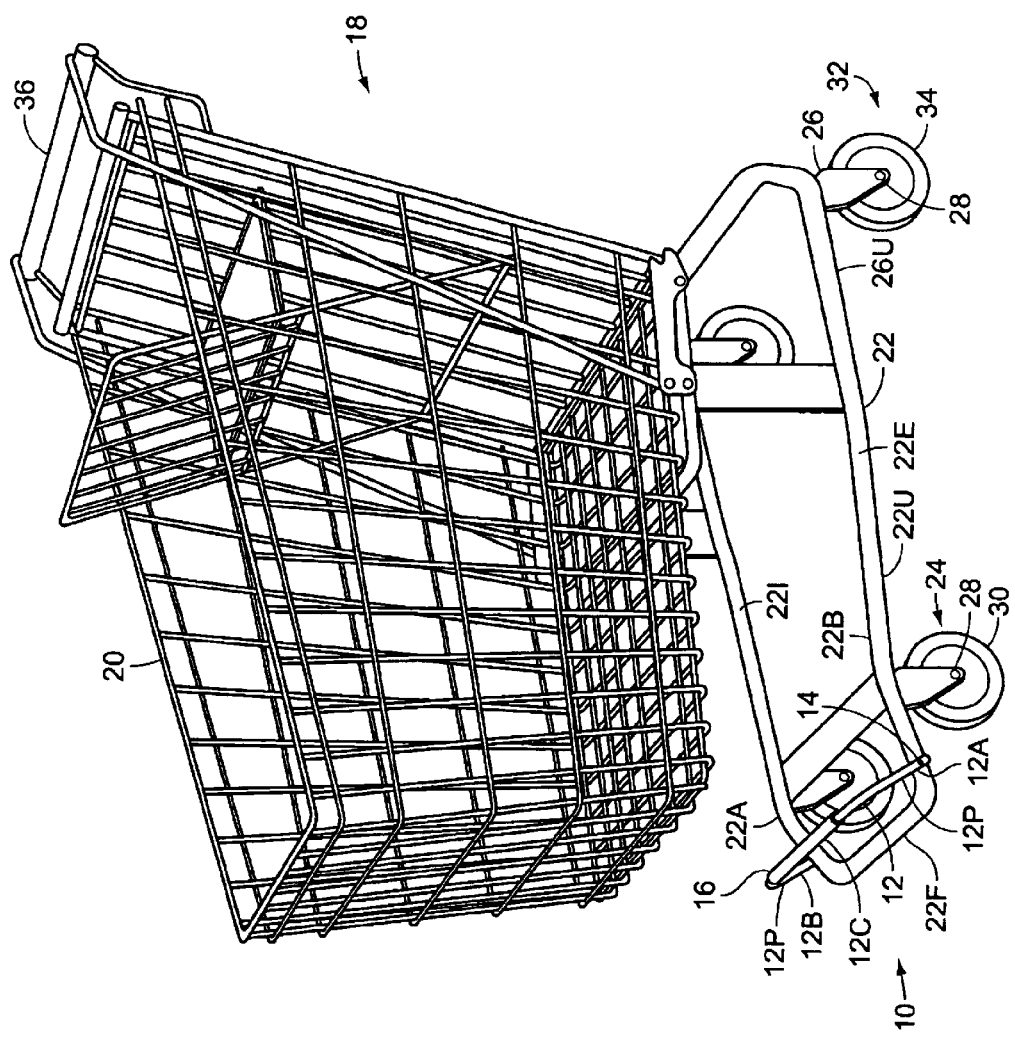
FIG. 1 is a perspective view of a shopping cart braking device in an unbraked position, after selective attachment to an existing shopping cart.

FIG. 1 illustrates a shopping cart braking device 10 after selective attachment to an existing shopping cart 18. The shopping cart 18 has a handle 36 for maneuvering the cart 18 between various locations on a support surface such as a floor, a basket 20 for selectively holding a variety of items, and a tubular chassis 22 having an internally oriented surface 22I, an externally oriented surface 22E, a first lateral side 22A, a second lateral side 22B, and a front crossbar 22F extending between the first lateral side 22A and the second lateral side 22B. The chassis 22 has an underside 22U having two front wheel assemblies 24 and two rear wheel assemblies 32 attached thereunto. The front wheel assemblies 24 each have a coaster 26 having an axle 28, and a front wheel 30 through which the axle 28 concentrically extends. Similarly, the rear wheel assemblies 32 each have a coaster 26 having an axle 28, and a rear wheel 34 through which the axle 28 concentrically extends. The shopping cart 18 is selectively moved between locations by rolling the shopping cart 18 upon its wheels 30 and 34.

The braking device 10 comprises a substantially U-shaped tube 12 having a first end 12A and a second end 12B, said tube 12 selectively hingeably attached to the externally oriented surfaces 22E of both the first lateral side 22A and the second lateral side 22B the chassis 22 of the shopping cart 18, in proximity to the front crossbar 22F, at a location on the chassis 22 which is between the front wheel assemblies 24 and the front crossbar 22F. The tube 12 has two substantially parallel portions 12P separated by a central connecting portion 12C. The braking device 10 is equipped with a substantially cylindrical, hollow brake pad 16 which selectively prevents the front wheels 30 from rotating, as will be described. The brake pad 16 is preferably constructed from a non-slippery rubber or plastic material. The connecting portion 12C extends concentrically through the brake pad 16. Each of the ends, 12A and 12B, of the tube 12 has a substantially cylindrical short hinge 14 extending partially inwardly therefrom, upon which the braking device 10 selectively swivels upon the chassis 22. In particular, each of the externally oriented surfaces 22E of the opposing lateral sides 22A, 22B of the chassis 22 has a circular opening drilled thereinto by the user, for selectively engaging the opposing hinges 14 of the braking device 10. Other methods for hingeably attaching the braking device 10 to the chassis 22 are contemplated. For example, the braking device 10 might additionally comprise two hollow cylindrical sleeves, each selectively attachable to one of the opposing lateral sides of the chassis 22, in proximity to the front crossbar 22F of the chassis 22, each of said sleeves having an indentation for selectively engaging the hinges 14 of the braking device 10, for allowing the braking device 10 to selectively rotate within the indentations, under a force applied by the foot of the user. This latter method of attachment would not require any permanent modification of the existing shopping cart 18. It should be noted that the braking device 10 may be attached to the chassis 22 in proximity to the rear wheel assemblies 32, in order to selectively prevent the rear wheels 34 from rotating and to thereby immobilize the shopping cart 18. It is additionally contemplated that the shopping cart 18 may be manufactured with the braking device 10 pre-attached.

The braking device 10 has a braked and an unbraked position. When the braking device 10 is in the unbraked position, the connecting portion 12C of the tube 12 has been elevated with respect to the support surface by the user, preferably with the foot of the user, and the brake pad 16 does not impede the rotation of the front wheels 30 of the shopping cart 18. To convert the braking device 10 to the braked position, the user lowers the connecting portion 12C of the tube 12 with respect to the support surface with the foot of the user, and selectively wedges the brake pad 16 between the front wheel 30 and the support surface upon which the shopping cart 18 rests. In this position, the brake pad 16 prevents rotation of the front wheels 30 of the shopping cart 18, and thereby immobilizes the shopping cart 18.

Figure 2:
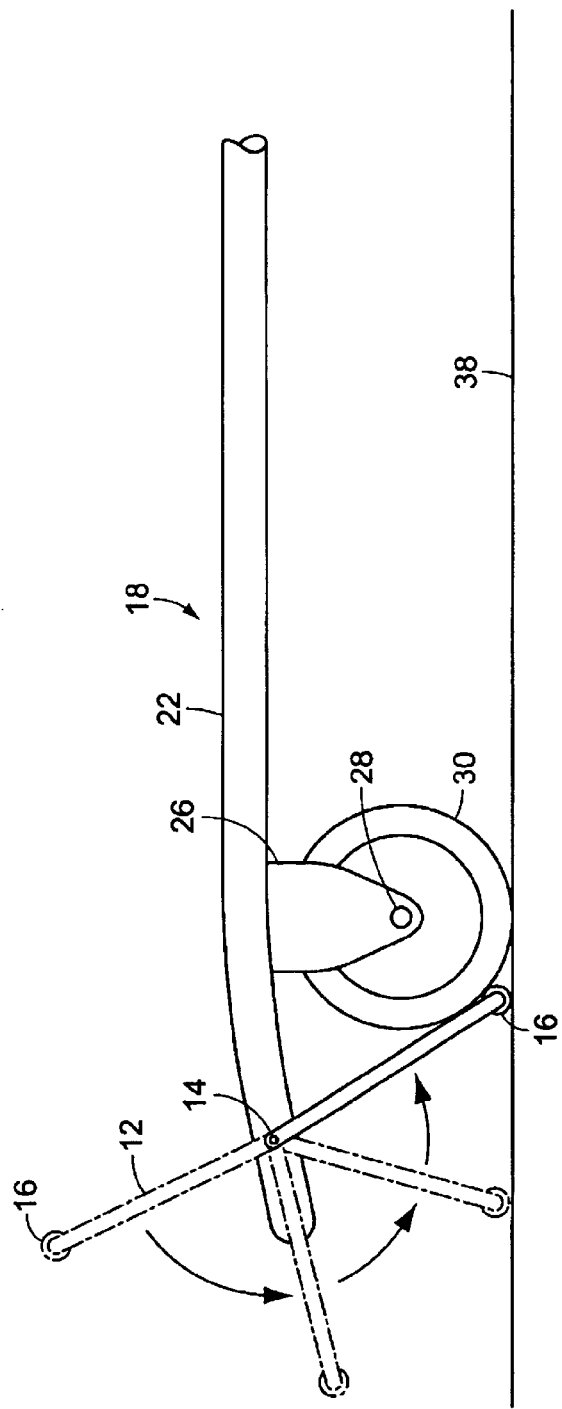
FIG. 2 is a side view of the braking device after selective attachment to the existing shopping cart, with portions of the shopping cart broken away, wherein the direction of the arrows indicates the direction in which the braking device is rotated by a user in order to selectively immobilize the shopping cart.

FIG. 2 illustrates the shopping cart braking device 10 after selective attachment to the chassis 22 of the shopping cart 18, with portions of the shopping cart 18 broken away. The shopping cart 18 is resting upon a support surface 38. The direction of the arrows indicates the direction in which the user rotates the braking device 10 upon its hinges 14 with the foot of the user, in order to immobilize the shopping cart 18 upon the support surface 38. The brake pad 16 has been wedged between the front wheels 30 and the support surface 38, thereby preventing the front wheels 30 from rotating.

In use, the user appends the shopping cart braking device 10 to an existing shopping cart 18 by hingeably attaching the first end 12A and the second end 12B of the device 10 to the first lateral side 22A and the second lateral side 22B of the chassis 22 of the shopping cart 18, in proximity to the front crossbar 22F, at a location on the chassis 22 which is between the front wheel assemblies 24 and the front crossbar 22F. The user converts the braking device 10 to the unbraked position by elevating the connecting portion 12C of the tube 12 with respect to the support surface with the foot of the user, thereby permitting rotation of the front wheels 30 of the shopping cart 18 and motion of the shopping cart 18. To convert the braking device 10 to the braked position, the user lowers the connecting portion 12C of the tube 12 with respect to the support surface with the foot of the user, and selectively wedges the brake pad 16 between the front wheels 30 and the support surface upon which the shopping cart 18 rests. In this position, the brake pad 16 prevents rotation of the front wheels 30 of the shopping cart 18, and thereby immobilizes the shopping cart 18.

In conclusion, herein is presented a shopping cart braking device for selectively immobilizing a shopping cart upon a support surface. The invention is illustrated by example in the drawing figures, and throughout the written description. It should be understood that numerous variations are possible, while adhering to the inventive concept. Such variations are contemplated as being a part of the present invention.

What is claimed is:

1. A shopping cart braking device for use with an existing shopping cart, by a user having at least one foot, for selectively immobilizing the shopping cart upon a support surface, said shopping cart having a handle for maneuvering the cart, a basket for holding various items, a chassis having an internally oriented surface, an externally oriented surface, a first lateral side, a second lateral side, and a front crossbar extending between the first lateral side and the second lateral side, said chassis further having an underside having at least two front wheel assemblies and at least two rear wheel assemblies attached thereunto, said wheel assemblies each having a selectively rotatable wheel, said braking device comprising a tube having a first end and a second end, each of said ends of the tube having a hinge upon which the braking device selectively swivels upon the chassis, said tube selectively hingeably attached, in proximity to its first end and its second end, to the first lateral side and the second lateral side of the chassis of the shopping cart, in proximity to the front crossbar and the front wheel assemblies of the cart, said tube having two substantially parallel portions separated by a central connecting portion, said braking device having a brake pad for selectively preventing the front wheels from rotating, said connecting portion extending concentrically through the brake pad, said braking device having an unbraked position wherein the connecting portion of the tube has been elevated with respect to the support surface with the at least one foot of the user, in order that the brake pad does not impede the rotation of the front wheels of the shopping cart, said braking device also having a braked position wherein the connecting portion of the tube has been lowered with respect to the support surface with the foot of the user, in order to selectively wedge the brake pad between the front wheels and the support surface, thereby preventing the front wheels of the shopping cart from rotating, and thereby immobilizing the shopping cart.

2. The shopping cart braking device as recited in claim 1, wherein the tube is substantially U-shaped.

3. The shopping cart braking device as recited in claim 2, wherein the braking device is attached, in proximity to the first end and the second end of the braking device, to the externally oriented surfaces of the first lateral side and the second lateral side of the chassis of the shopping cart.

4. The shopping cart braking device as recited in claim 2, wherein the braking device is attached, in proximity to the first end and the second end of the braking device, to the internally oriented surfaces of the first lateral side and the second lateral side of the chassis of the shopping cart.

5. A shopping cart braking device for use with an existing shopping cart, by a user having at least one foot, for selectively immobilizing the shopping cart upon a support surface, said shopping cart having a handle for maneuvering the cart, a basket for holding various items, a chassis having an internally oriented surface, an externally oriented surface, a first lateral side, a second lateral side, said chassis further having an underside having at least two front wheel assemblies and at least two rear wheel assemblies attached thereunto, said wheel assemblies each having a selectively rotatable wheel, said braking device comprising a tube having a first end and a second end, each of said ends of the tube having a hinge upon which the braking device selectively swivels upon the chassis, said tube selectively hingeably attached, in proximity to its first end and its second end, to the first lateral side and the second lateral side of the chassis of the shopping cart, in proximity to the rear wheel assemblies of the cart, said tube having two substantially parallel portions separated by a central connecting portion, said braking device having a brake pad for selectively preventing the rear wheels from rotating, said connecting portion extending concentrically through the brake pad, said braking device having an unbraked position wherein the connecting portion of the tube has been elevated with respect to the support surface with the at least one foot of the user, in order that the brake pad does not impede the rotation of the rear wheels of the shopping cart, said braking device also having a braked position wherein the connecting portion of the tube has been lowered with respect to the support surface with the foot of the user, in order to selectively wedge the brake pad between the rear wheels and the support surface, thereby preventing the rear wheels of the shopping cart from rotating, and thereby immobilizing the shopping cart.

6. A method of using a shopping cart braking device by a user having at least one foot, in conjunction with an existing shopping cart, for selectively immobilizing the shopping cart upon a support surface, said shopping cart having a handle for maneuvering the cart, a basket for holding a variety of items, an underlying tubular chassis having an internally oriented surface, an externally oriented surface, a first lateral side, a second lateral side, and a front crossbar extending between said first lateral side and second lateral side, said chassis having an underside having at least two front wheel assemblies and at least two rear wheel assemblies attached thereunto, each of said wheel assemblies having a rotatable wheel, said braking device having a tube having a first end and a second end, each of said ends of the tube having a hinge, said tube having two substantially parallel portions separated by a central connecting portion, said connecting portion having a brake pad, said braking device having an unbraked position and a braked position, said method comprising the steps of:

a) attaching the hinges of the shopping cart braking device to the first lateral side and the second lateral side of the chassis of the shopping cart, in proximity to the front crossbar and the front wheel assemblies of the existing shopping cart;

b) converting the braking device to the unbraked position by elevating the connecting portion of the tube with respect to the support surface by swiveling the braking device upward upon its hinges with the at least one foot of the user, thereby permitting rotation of the front wheels of the shopping cart and motion of the shopping cart; and c) converting the braking device to the braked position by lowering the connecting portion of the tube with respect to the support surface by swiveling the braking device downward upon its hinges with the at least one foot of the user, and by selectively wedging the brake pad between the front wheels and the support surface upon which the shopping cart rests, thereby preventing the front wheels from rotating, and thereby immobilizing the shopping cart.

* * * * *